United States Patent

[11] 3,600,688

[72] Inventor Robert C. Booth
 Bethlehem, Pa.
[21] Appl. No. 30,398
[22] Filed Apr. 21, 1970
[45] Patented Aug. 17, 1971
[73] Assignee Bethlehem Steel Corporation

[54] SIGNAL DISCRIMINATOR CIRCUIT
 3 Claims, 2 Drawing Figs.
[52] U.S. Cl. .................................................. 328/111,
 307/231, 307/234, 307/235, 328/110, 328/112,
 328/117, 328/108
[51] Int. Cl. ...................................................... H03k 5/20
[50] Field of Search .......................................... 307/231,
 234, 235; 328/110, 111, 112, 117, 151, 108

[56] References Cited
UNITED STATES PATENTS
| 3,386,079 | 5/1968 | Wiggins | 328/110 X |
| 3,409,789 | 11/1968 | Cantella | 328/112 X |
| 3,437,833 | 4/1969 | Razaitis et al. | 328/110 X |
| 3,437,834 | 4/1969 | Schwartz | 328/110 X |
| 3,465,169 | 9/1969 | Foerster | 307/235 |
| 3,505,537 | 4/1970 | Giordano | 307/234 X |

Primary Examiner—Donald D. Forrer
Assistant Examiner—R. C. Woodbridge
Attorney—A. M. Griffin ABSTRACT: A circuit, for eddy current testing of steel shapes, which discriminates input pulses caused by severe defects from input pulses caused by minor defects as well as pulses caused by changes in the properties of the shapes. The circuit discriminates input pulses greater than a minimum amplitude and less than a maximum width from other pulses.

INVENTOR
Robert C. Booth

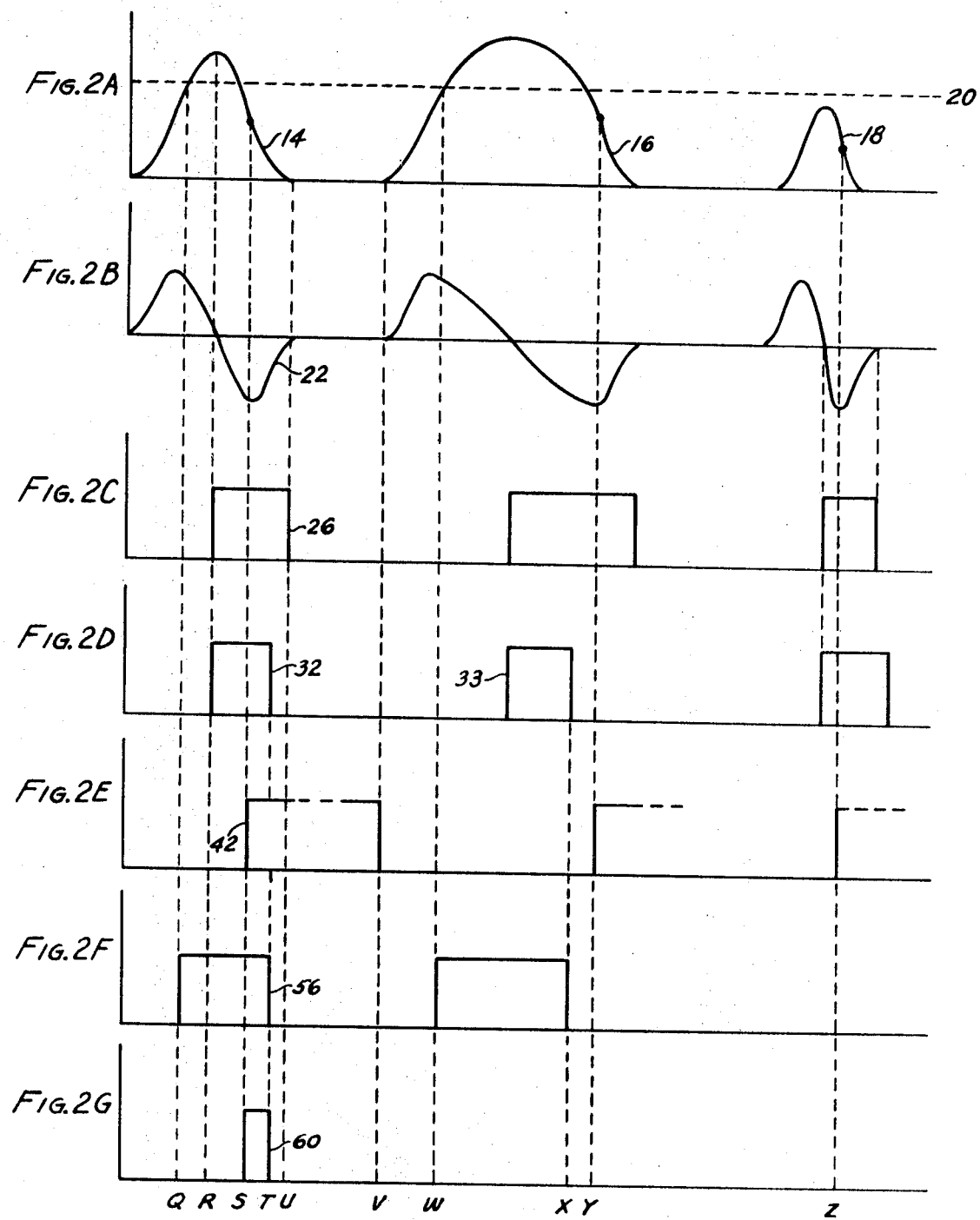

SIGNAL DISCRIMINATOR CIRCUIT

BACKGROUND OF THE INVENTION

This invention relates to pulse discriminator circuits, and more particularly to such circuits in which pulses greater than a minimum amplitude and less than a maximum width are discriminated from other pulses.

High quality as-rolled steel shapes, e.g. bars to be cold-headed, are increasingly being inspected for surface defects following hot rolling. One method commonly used is eddy current testing.

In eddy current testing, the test equipment is sensitive to variations in the properties of the test piece as well as to surface defects such as seams. For example, changes in the permeability and conductivity of the test piece due to scale on the surface thereof can cause an output signal comparable in amplitude to signals caused by relatively severe defects in the surface of the test piece being inspected.

In the past, signals caused by scale were discriminated from defect signals by level detectors. This, of course, was undesirable inasmuch as only signals of very large amplitude, indicative of very severe defects, were detected, while signals of lesser amplitude, indicative of lesser but still relatively severe defects, were not detected. In order to detect such less severe defects, the steel test piece had to be descaled prior to testing.

It is an object of this invention to provide a circuit which discriminates signals greater than a minimum amplitude and less than a maximum width from other pulses.

It is a further object to provide such a circuit for detecting signals caused by relatively severe defects in a test piece which has not been descaled, while signals of a similar amplitude but resulting from other causes, e.g. scale, are not detected.

SUMMARY OF THE INVENTION

It has been found that, in the inspection of steel shapes by eddy currents, while the signals caused by scale are comparable in amplitude to signals caused by relatively severe defects, the signals caused by scale are greater in width. Signals caused by scale, as well as signals caused by minor defects, such as shallow seams, can be discriminated from severe defects such as deep seams, by providing a circuit which responds only to signals greater than a minimum amplitude which are also of less than a maximum width.

In accordance with the foregoing, I provide means for producing a first signal at the peak of an input pulse and a second signal at the time said input pulse has decreased from said peak value by a predetermined extent, e.g. 50 percent therefrom. Additional means is provided for producing a third signal for a predetermined period after the peak of said input pulse. Means is also provided for producing a fourth signal only when the amplitude of the input pulse exceeds a minimum magnitude.

An output signal is produced only when: (1) said second signal is produced during the period of said third signal; and (2) there is a fourth signal.

BRIEF DESCRIPTION OF THE DRAWINGS

FIG. 2 shows the waveforms at various points in the diagram of FIG. 1.

DESCRIPTION OF THE PREFERRED EMBODIMENT

Figure 1:
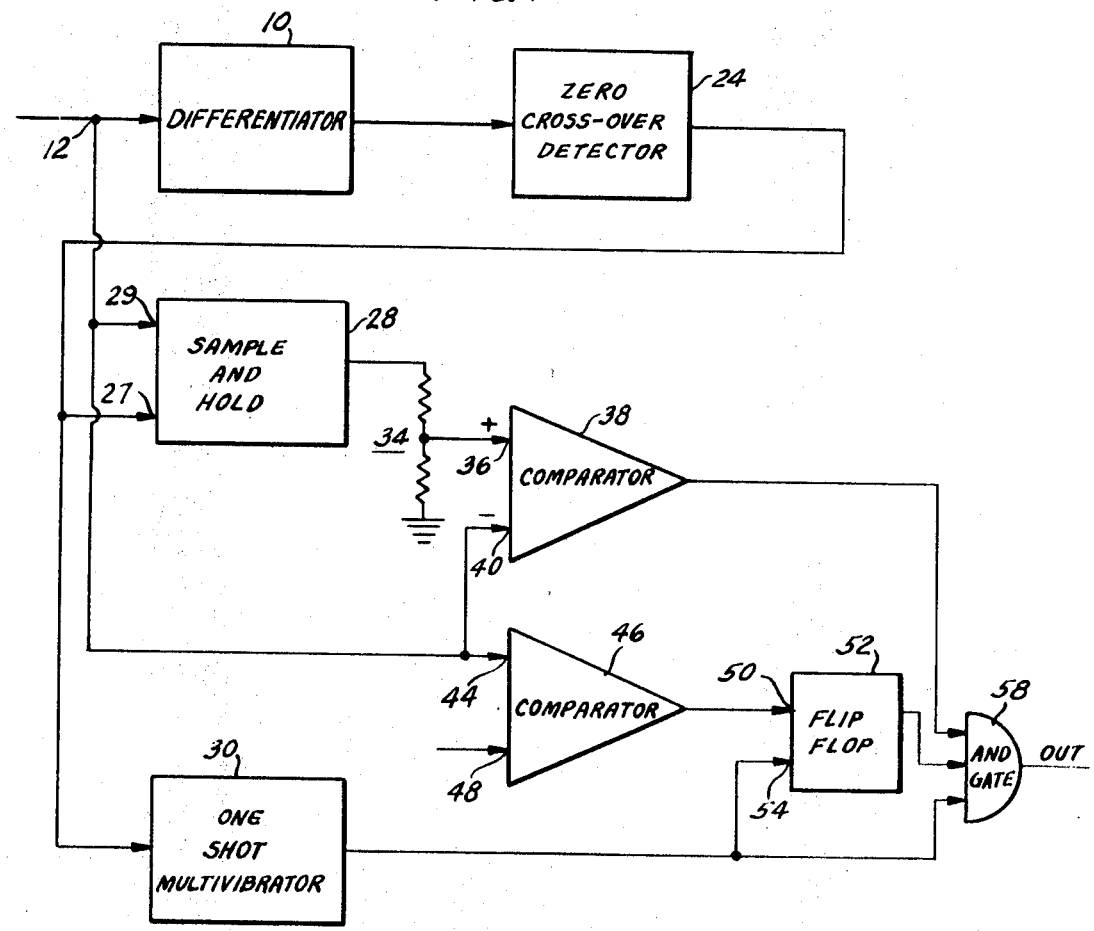
FIG. 1 is a block diagram of the invention.

As is shown in FIG. 1, a differentiator 10 is connected to an input terminal 12 to receive input pulses from a device such as eddy current test equipment. Typical input pulses are shown in FIG. 2A and are identified therein as 14, 16 and 18.

Pulse 14 is representative of a defect which it is desired to detect, pulse 16 represents a typical pulse caused by scale, while pulse 18 is representative of a minor defect which is not to be detected. The amplitudes of both pulses 14 and 16 exceed a threshold level 20, while the amplitude of pulse 18 is less than said level. As can be seen, the ratio of the width to the maximum amplitude of pulse 16 is much greater than that for pulses 14 and 18.

The output of the differentiator 10 is shown in FIG. 2B. At time R the input pulse 14 reaches its peak; hence, the output 22 of the differentiator at time R is zero.

The differentiator 10 provides the input to a zero crossover detector 24, the output of which is shown in FIG. 2C. Said detector produces a square wave 26 which begins when the output 22 of the differentiator goes negative and persists until said output returns to, or passes through, zero, e.g. at time U.

The output from the zero crossover detector 24 is supplied to one input terminal 27 of a sample-and-hold circuit 28. A second input terminal 29 of said sample-and-hold circuit 28 is supplied with input pulses from the input terminal 12. A signal from the zero crossover detector 24 causes the sample-and-hold circuit 28 to hold the amplitude value of the input signal to terminal 29.

The output from the zero crossover detector 24 is also supplied to, and serves to actuate, a one-shot multivibrator 30. The output 32 from said multivibrator 30 is shown in FIG. 2D and comprises a square wave having a period which begins at time R and ends at time T.

The sample-and-hold circuit 28 produces an output signal at the peak of the input signal 14, the amplitude of said output signal being proportional to the amplitude of said input signal. Said output signal is subsequently supplied to a device, e.g. voltage divider 34, for reducing the amplitude of said signal by a predetermined extent. Voltage divider 34 provides an input signal to one terminal 36 of a comparator 38, said signal having an amplitude which is equal to a fixed percentage, e.g. 50 percent, of the peak amplitude of the input signal 14.

The input signal 14 is supplied to another input terminal 40 of the comparator 36. At time S, the amplitude of the input signal 14 decreases to a value below that of the signal supplied to the terminal 36, and the comparator produces an output pulse 42, shown in FIG. 2E. The pulse 42 has a period which ends when the next input pulse, viz. pulse 16, is supplied to the input terminal 12. The pulse 16 is shown beginning at time V.

The input signal, e.g. pulse 14, is also supplied to one input terminal 44 of a minimum amplitude detector comprising a comparator 46. Another input terminal 48 of the comparator 46 is supplied with a threshold level reference signal 20 having an amplitude as shown in FIG. 2A.

At time Q, the amplitude of the pulse 14 equals the threshold level 20 and causes the comparator 46 to produce an output pulse which is supplied to an input terminal 50 of a flip-flop 52. The flip-flop 52 is provided with another input terminal 54 which is connected to the output of the multivibrator 30. As shown in FIG. 2F, the output signal 56 from the flip-flop 52 is a square wave which is triggered by an output from the comparator 46 and is terminated coincidentally with the termination of the output signal 32 of the multivibrator 30.

The output signals from the comparator 38, the flip-flop 52 and the multivibrator 30 are all supplied to an AND gate 58. As shown in FIG. 2G, an output signal 60 from the AND gate 58 occurs only when: (1) the output signal 42 from the comparator 38 is initiated during the period of the output signal 32 from the multivibrator 30; and (2) there is an output signal 56 at this time. Thus, only input signals of a minimum amplitude and a maximum width will be detected.

An input pulse such as pulse 16 will not be detected because its width exceeds the predetermined maximum. At time W, the amplitude of the pulse reaches the threshold level 20 and one of the necessary conditions for detection is satisfied. However, the signal 33 from the multivibrator 30 terminates at time X, which occurs before the pulse 16 has decreased to 50 percent of its peak level at time Y. Thus, there will be no output from the AND gate 58.

Input pulse 18 will not be detected because its peak amplitude does not equal or exceed the threshold level 20. The fact that its amplitude decreases by 50 percent from its peak at time Z, which is well within the period of the multivibrator pulse, is of no significance, as only one of the two conditions necessary for detection has been fulfilled.

I claim:

1. A circuit for discriminating an input pulse of greater than a minimum amplitude and less than a maximum width from other pulses, comprising:
   a. means for producing a first signal at the peak amplitude of said input pulse;
   b. means for producing a second signal at the time the amplitude of said input pulse has decreased by a predetermined extent from its peak value;
   c. means responsive to said first signal for producing a third signal for a predetermined period after the peak of said input pulse;
   d. means for producing a fourth signal only when the amplitude of said input pulse equals or exceeds a minimum magnitude, said fourth signal beginning at the time said minimum amplitude is equalled and lasting until the end of said third signal; and
   e. means for producing a fifth signal only when: (1) said second signal is produced during the period of said third signal; and (2) there is a fourth signal.

2. A circuit as recited in claim 1, in which means
   a. comprises a differentiator having an input terminal to which said input pulse is supplied, and a zero crossover detector to which the output of said differentiator is supplied.

3. A circuit as recited in claim 2, in which means
   b. comprises:
      i. a sample-and-hold circuit having a first input terminal to which said input pulse is supplied, and a second input terminal connected to the output of said zero crossover detector; and
      ii. a voltage divider network connected to the output of said sample-and-hold circuit.
      ii. a voltage divider network connected to the and more particularly to phase difference detectors for detecting phase difference between two similar wave trains.